United States Patent
Beneker et al.

(10) Patent No.: US 12,013,005 B2
(45) Date of Patent: Jun. 18, 2024

(54) RUBBER-METAL BUSH BEARING

(71) Applicant: VORWERK AUTOTEC GMBH & CO. KG, Wuppertal (DE)

(72) Inventors: Wilfried Beneker, Leichlingen (DE); Frank Roeder, Sprockhoevel (DE); Holger Ahrens, Wuppertal (DE); Bernd Westerhoff, Castrop-Rauxel (DE); Wasiliy Jaschenkow, Bochum (DE)

(73) Assignee: VORWERK AUTOTEC GMBH & CO. KG, Wuppertal (DE)

( * ) Notice: Subject to any disclaimer, the term of this patent is extended or adjusted under 35 U.S.C. 154(b) by 323 days.

(21) Appl. No.: 17/450,846

(22) Filed: Oct. 14, 2021

(65) Prior Publication Data
US 2023/0124544 A1  Apr. 20, 2023

(51) Int. Cl.
*F16F 1/38* (2006.01)
*F16F 1/387* (2006.01)

(52) U.S. Cl.
CPC .......... *F16F 1/3842* (2013.01); *F16F 1/3863* (2013.01); *F16F 1/387* (2013.01); *F16F 2228/08* (2013.01)

(58) Field of Classification Search
None
See application file for complete search history.

(56) References Cited

U.S. PATENT DOCUMENTS

| | | | |
|---|---|---|---|
| 2004/0012167 A1 | 1/2004 | Buhl et al. | |
| 2012/0098226 A1* | 4/2012 | Rodecker | F16F 1/16 280/124.167 |
| 2016/0052357 A1* | 2/2016 | Cha | F16F 1/3863 29/896.91 |
| 2016/0208879 A1 | 7/2016 | Conrad et al. | |
| 2018/0135716 A1 | 5/2018 | Zimmerman et al. | |
| 2019/0170210 A1* | 6/2019 | Ohji | B62D 27/04 |

FOREIGN PATENT DOCUMENTS

| | | |
|---|---|---|
| DE | 10118623 | 12/2002 |
| DE | 102013018609 | 3/2014 |
| DE | 102015000568 | 7/2016 |
| DE | 102016212746 | 1/2018 |
| DE | 102019006248 B3 * | 1/2021 |
| EP | 0524844 A1 * | 1/1993 |
| FR | 1350467 | 11/1995 |

* cited by examiner

*Primary Examiner* — Melanie Torres Williams
(74) *Attorney, Agent, or Firm* — Grossman, Tucker, Perreault & Pfleger, PLLC

(57) ABSTRACT

A rubber-metal bush bearing, in particular a control arm bearing for a motor vehicle wheel suspension, including a metal inner part, an elastomer body arranged radially relative to the inner part and a metal outer bush, wherein the elastomer body is fixed to the inner part and to the outer bush in material-bonded relationship and wherein the outer bush is for fixing in an associated bearing eye of an arm and the inner part has at both sides in terminal relationship a respective flat flange portion for fixing to a component. The inner part is an extruded hollow-chamber profile member which is cut to length and which at both longitudinal ends is transformed in terminal relationship into the respective flat flange portion in such a way that oppositely disposed wall portions of the hollow-chamber profile member are brought into mutual surface contact.

20 Claims, 2 Drawing Sheets

RUBBER-METAL BUSH BEARING

FIELD

The invention concerns a rubber-metal bush bearing, in particular a transverse control arm bearing, for a motor vehicle wheel suspension, including a metal inner part, an elastomer body arranged radially relative to the inner part and a metal outer bush, wherein the elastomer body is fixed to the inner part and to the outer bush in material-bonded relationship and wherein the outer bush for fixing in an associated bearing eye of an arm and the inner part has at both sides in terminal relationship a respective flat flange portion for fixing to the vehicle chassis or the bodywork of the vehicle.

BACKGROUND

A rubber-metal bush bearing of that kind, frequently also referred to as an elastomer bush bearing, is well-known in the art. Bearings of that kind are used in particular on transverse or track control arms which are arranged for example in the individual wheel suspension on motor vehicles transversely relative to the direction of travel. While the axial stiffness and in particular the torsional stiffness of such bearings is comparatively low increased demands are to be made on the radial stiffness of such bearings. The resulting strength demands concern on the one hand the elastomer body, but in addition also the inner part of the bearing which is conventionally produced in the form of a die-cast component or a forged component. Besides providing the described strength for the bearing, in particular the inner part, a further endeavor is to improve the response behavior of the system to the operating forces transmitted by the wheels.

SUMMARY

The rubber-metal bush bearing according to the invention has a metal inner part, an elastomer body arranged radially with respect to the inner part and an outer bush which can be made in particular from metal, wherein the elastomer body is fixed to the inner part and to the outer bush in material-bonded relationship, in particular by vulcanization. In that case the outer bush of the bearing is designed for fixing in an associated bearing eye of an arm, for example a transverse track control arm, wherein the inner part at both sides terminally has a respective flat flange portion for fixing to a further motor vehicle component. The rubber-metal bush bearing according to the invention is characterised in that the inner part is an extruded hollow-chamber profile member which is cut to length and which at both longitudinal ends is transformed in terminal relationship into the respective flat flange portion in such a way that oppositely disposed wall portions of the hollow-chamber profile member are brought into mutual surface contact in a transverse direction perpendicularly to a longitudinal axis of the bearing.

The rubber-metal bush bearing according to the invention is based on the fundamental idea of reducing the mass of the bearing by providing an extruded hollow-chamber profile member, wherein the flat flange portions for fixing the bearing to a motor vehicle chassis are produced by transformation of the extruded profile member in the region of the end portions of the hollow-chamber profile member. At the same time as a reduction in the weight of the inner part and thus the entire bearing it is also possible to achieve a higher level of strength for the inner part in relation to flexural forces in comparison with a die-cast inner part. Depending on the respective design configuration the extruded hollow-chamber profile member can be produced for example from an aluminum material or from a steel material.

The bearing according to the invention in that respect has an inner part which in a central region is a hollow-chamber profile member which in particular can be identical to the initial extruded hollow-chamber profile member and which in the region of its axial end portions is formed by said flange configurations for fixing of the bearing. In that respect those flange configurations can be formed by transformation of the initial extruded hollow-chamber profile member within the axial extent of the flange portions.

The expression "extruded hollow-chamber profile member which is cut to length" is used to denote a portion of an initial extruded hollow-chamber profile of a length governed by manufacture, which is separated from the latter so as to be of a predetermined axial extent and from which the inner part of the bearing according to the invention is shaped into the two flat flange portions by transformation of the two longitudinal end portions.

The term elastomer is used to denote generally shape-retaining but elastically deformable plastics, for example vulcanizates of natural or silicone rubber.

Further features and developments of the invention are set forth in the general description hereinafter, the Figures, the specific description and the appendant claims.

Preferably it can be provided that the respective flange portions have two mutually associated flat-shaped flange strips which are brought into mutual contact. The respective flange strips of the flange portions can thus represent the mutually opposite wall portions of the hollow-chamber profile member which are brought into mutual surface contact. Such a configuration of the flange portions by virtue of flange strips can in principle be set with a large number of hollow-chamber profile members, in particular also hollow-chamber profile members of polygonal or tubular cross-section so that the hollow central portion of the inner part can be matched to specific demands.

Different configurations are possible for fixing the inner part of the bearing according to the invention. By way of example the flange portions can be designed for clamping to a motor vehicle component. Desirably it can also be provided that the two flange portions have a respective bore which extends through both associated flange strips that bear against each other, the bore extending perpendicularly to the flange plane, in particular for receiving a respective screw bolt with which the inner part of the bearing according to the invention can be secured to the motor vehicle component.

To increase the strength of the inner part in the region of the flange portions it can be provided that the transformation of the extruded hollow-chamber profile member to constitute the flange portions is such that the respective flange portions of the inner part of the rubber-metal bush bearing according to the invention have two mutually associated flat-shaped flange strips which are brought into mutual contact and which are connected together at their longitudinal sides or edges by way of curved portions. Like the flange strips those curved portions can be formed by respective axial portions of the shaped hollow-chamber profile member.

In a particularly desirable embodiment, in particular for providing substantially rotationally symmetrical strength in respect of the inner part in the region of the central portion in relation to flexural warpage it can desirably be provided that the extruded hollow-chamber profile member for forming the inner part of the bearing according to the invention is a hollow-cylinder profile member so that the inner part is substantially of a hollow cylinder-like configuration axially inwardly in relation to the flange portions after the shaping thereof. In addition such a hollow cylinder-like extruded hollow-chamber profile member makes it easier to configure the flange portions by transformation of the hollow-chamber profile member in such a way that the respective flange portion has the two mutually associated, flat-shaped flange strips which are brought to bear against each other, wherein at the same time the flat flange strips which are brought to bear against each other, by virtue of a peripherally closed hollow cylinder-like hollow-chamber profile, can be connected by way of the curved portions which portion-wise extend perpendicularly to the flange plane.

In order on the one hand to increase the strength of the inner part of the bearing according to the invention in a central portion of the inner part in relation to flexing and on the other hand to make it easier to configure the two flange portions by transformation of the extruded hollow-chamber profile member in the region of the end portions it can desirably be provided that a radial wall thickness of the hollow-chamber profile member in a central portion of the inner part, that is to say in the region of the hollow-cylindrical configuration of the inner part, is larger at least by 20%, in particular by 30%, than the thickness of one of the mutually opposite wall portions in the region of the respective flange portion. Such a configuration can be provided for example by turning a predetermined wall thickness in the region of the end portions of the in particular cylindrical hollow-chamber profile member prior to transformation of the hollow-chamber profile member to provide the respective longitudinal portions of the flange portions.

To provide a predetermined identification of the bearing according to the invention in the axial direction it can desirably be provided that the inner part, in a portion axially inward in relation to the flange portions, in particular a central portion of the inner part, is waisted by transformation of the hollow-chamber profile member. In that respect it can be provided that the smallest radial diameter of the outer peripheral surface of the inner part in the region of the hollow-chamber portion (central portion) is approximately in the middle of the overall axial extent of the inner part. In particular to increase radial stiffness of the bearing according to the invention it can desirably be provided that the elastomer body of the bearing has an insert which is arranged peripherally around the inner part and is embedded in the elastomer and which includes a material which is hard in relation to the elastomer, like for example metal or hard plastic, and which extends at least over the entire axial extent of the outer bush. It can preferably be provided in that respect that the insert is of a sleeve-shaped configuration.

To provide a predetermined cardanic of the bearing according to the invention, that is to say relative tilting of the inner part relative to the outer bush, it can desirably be provided that at its peripheral surface facing towards the inner part the insert is adapted in relation to its curvature to the waisting of the inner part in such a way that a radially continuous elastomer layer arranged between the inner part and the insert is substantially of a constant radial thickness over its entire axial extent.

To increase the stability of the bearing according to the invention, in particular to avoid a tensile loading on the elastomer of the elastomer body in operation of the bearing according to the invention it can desirably be provided that it is adapted to be pressed into an associated bearing eye with radial prestressing by virtue of the elastomer body and the outer bush being of an axially slit configuration in such a way that the gap formed thereby on the elastomer body and the axial gap on the outer bush are peripherally aligned relative to each other.

By virtue of the provision of an extruded hollow-chamber profile member for constituting the inner part of the bearing according to the invention not only the flange portions for fixing the transverse control arm bearing to the vehicle bodywork but in addition also the central portion of the inner part can be designed to be flexibly set to the respective demands in regard to the identification of the control arm bearing by respective transformation shaping using an inexpensive procedure.

BRIEF DESCRIPTION OF THE DRAWINGS

The invention is described hereinafter by the description of an embodiment of a bearing according to the invention together with modifications with reference to the accompanying Figures in which.

DETAILED DESCRIPTION

Figure 1:
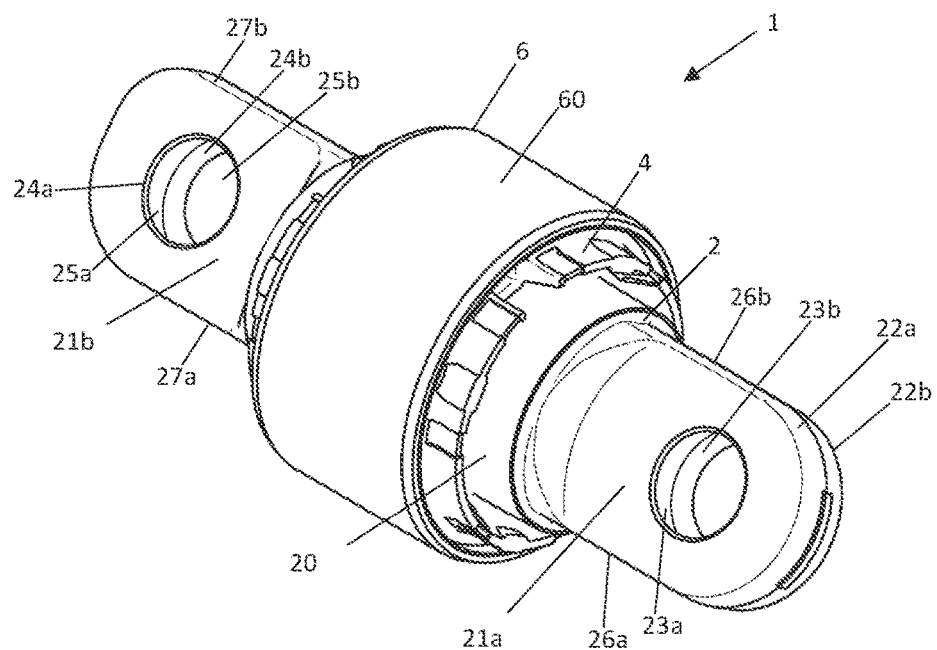
FIG. 1 shows a perspective view of a rubber-metal bush bearing according to the invention.

The embodiment described hereinafter of a bearing according to the invention is in the form of a transverse control arm bearing 1 in which a control arm is connected by way of the control arm bearing 1 described hereinafter to the bodywork and at an end towards the wheel to a wheel carrier by way of a wheel mounting joint. Linkage arrangements of that kind can be installed both at the front axle and also at the rear axle of the motor vehicle. FIG. 1 shows a perspective view illustrating the fundamental structure of the control arm bearing 1 according to the invention. The bearing 1 here is in the form of an elastomer bush bearing in which an inner part 2 has an axial central portion 20 with an approximately cylindrical peripheral surface which is axially adjoined in material-bonded relationship by flange portions 21a, 21b which are respectively formed by two flange strips 22a, 22b and 24a, 24b respectively which brought to bear against each other, wherein the mutually associated flange strips 22a, 22b and 24a, 24b are connected by longitudinally extending curved portions 26a,b and 27a,b. The inner part 2 of the control arm bearing 1 according to the invention is in the form of an extruded hollow-chamber profile member made from an aluminum or steel material, with a here cylindrical hollow-chamber cross-section, wherein to provide the two flange portions 21a, 21b respective terminal transformation of the hollow-chamber profile member is carried out in such a way that mutually opposite wall portions of the cylindrical hollow-chamber profile member are brought into mutual surface contact in the region of the flange portions 21a, 21b, the wall portions being connected together at their longitudinal sides by curved portions.

The control arm bearing 1 according to the invention has an outer bush 6 which is arranged in spaced relationship with the central portion or the cylindrical peripheral surface 20 of the inner part 2 and which peripherally embraces the inner part 2 in the central portion 20 in radially spaced relationship. In this arrangement disposed between the inner part 2 and the outer bush 6 is an elastomer body 4 which in the described embodiment is vulcanized both to the outer bush 6 and also to the cylindrical peripheral surface 20 of the inner part 2. To provide for fixing of the two flange portions 21a, 21b of the control arm bearing 1 to a chassis the flange portions 21a, 21b have bores 23a, 23b and 25a, 25b extending through the two respectively associated flange strips 22a, 22b and 24a, 24b, for example for receiving a screw bolt. In the described embodiment the control arm bearing 1 is adapted to be received in an associated bearing eye of the control arm in such a way that the here cylindrical outer peripheral surface 60 of the outer bush 6 comes into contact with an associated delimiting surface of the bearing eye, in particular by the control arm bearing 1 being pressed into the bearing eye. In an embodiment it can be provided that the control arm bearing 1 has an axially slit elastomer body 4 and an axially slit outer bush 6 for constituting a respective mutually peripherally aligned gap in such a way that the respective gap is closed by the control arm bearing 1 being pressed into the bearing eye and thus the elastomer of the elastomer body 4 is radially prestressed.

Figures 2A, 2B:
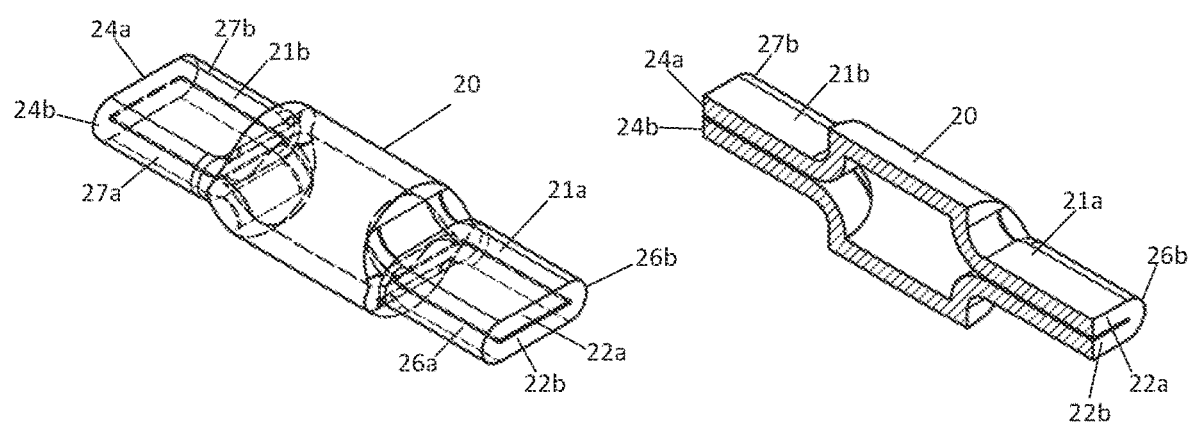
FIG. 2a shows a perspective view of a precursor product of an inner part of the bearing according to the invention shown in FIG. 1.
FIG. 2b shows the precursor product of the inner part of FIG. 2a in a section plane perpendicular to the plane of the flange portions.

FIG. 2 shows a precursor product of the inner part 2 of the control arm bearing 1 of FIG. 1 designed in accordance with the invention as a perspective view (FIG. 2a) and as a longitudinal section (FIG. 2b), the section plane being perpendicular to the plane of the flange portions 21a, 21b. The starting product of the inner part 2 of the control arm bearing 1 according to the invention is a tubular extruded profile member of cylindrical cross-section of predetermined length, which at its two longitudinal ends is subjected to transformation over a predetermined axial extent in such a way that the two mutually opposite cylinder half-sections are converted to the flange strips 22a, 22b and 24a, 24b which are brought into mutual contact, wherein the contacting flange strips 22a, 22b and 24a, 24b are connected together by respective curved longitudinal portions 26a, 26b and 27a, 27b respectively. Starting from the precursor product shown in FIGS. 2a and 2b the inner part 2 of the control arm bearing 1 according to the invention can be finished by introducing the flange bores 23a, 23b and 25a, 25b into the respective flange strips 22a, 22b and 24a, 24b respectively. By producing the bores 23a,b and 25a,b in the flange portions the precursor product for the inner part 2 in FIG. 2 can be shaped to constitute the inner part of the bearing shown in FIG. 1.

In an embodiment it can also be provided that the cylindrical peripheral surface in the central portion 20 of the inner part 2 is to be waisted by suitable shaping, and this will be discussed in greater detail hereinafter.

Figure 3:
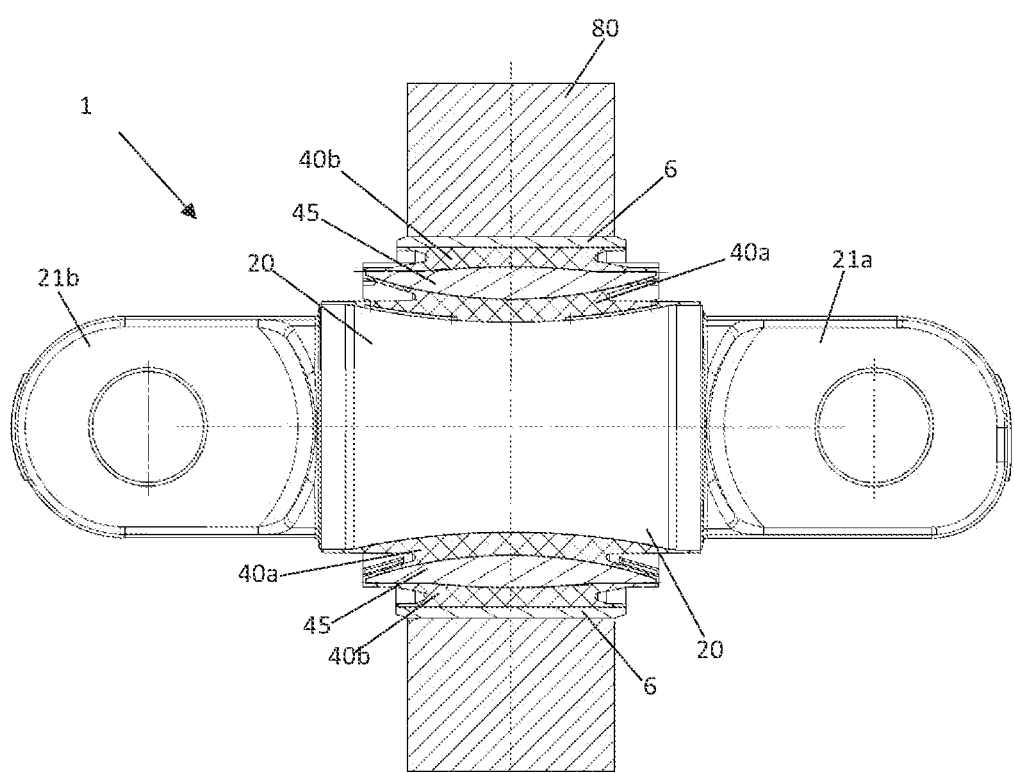
FIG. 3 shows a longitudinal section of the bearing according to the invention as shown in FIG. 1.

FIG. 3 shows a control arm bearing 1 designed in accordance with the invention, similar to that shown in FIG. 1, as a longitudinal section in a section plane which in the Figure is somewhat above the plane of the flange portions 21a, 21b, showing an operating situation in which the control arm bearing 1 is pressed into an associated bearing eye of an arm 80. As can be seen from the section through the cylindrical central portion 20 of the inner part 2 the approximately cylindrical peripheral surface is waisted in the central portion 20, wherein the elastomer body 4 includes a first axial elastomer spur or layer 40a, a sleeve-shaped insert 45 and a second axial elastomer spur or layer 40b in such a way that the insert is embedded by the two elastomer spurs or layers. At its inner peripheral surface that faces towards the inner part 2 the sleeve-shaped insert 45 can have a curved surface which is matched to the waisting of the central portion 20 of the inner part 2 in such a way that the radial thickness of the first axially extending elastomer spur 40a is of an approximately constant thickness in the radial direction over its predominant axial extent to provide a predetermined cardanic of the control arm bearing 1. In contrast, in the described embodiment, the radial thickness of the second axial elastomer spur 40b increases axially outwardly starting from the axial center of the central portion 20 of the inner part 2, once again to provide a predetermined cardanic of the control arm bearing 1. In the described embodiment the elastomer body 4 is connected to the outer bush 6 and the inner part 2 in the region of its central portion or its waisted cylindrical peripheral surface 20 in material-bonded relationship by vulcanization.

The control arm bearing 1 according to the invention as shown in FIG. 1 differs from that shown in FIG. 3 solely by virtue of a purely cylindrical configuration of the central portion of the inner part 2, wherein the elastomer body 4 can again include a first axial elastomer spur or layer, a sleeve-shaped insert and a second axial elastomer spur or layer in such a way that the insert is embedded by the two elastomer spurs or layers. In this embodiment the two elastomer spurs and the insert can be of a cylindrical configuration.

The man skilled in the art recognizes that the provision of an extruded hollow-chamber profile member for forming the inner part 2 of the bearing according to the invention means that not only the flange portions 21a, 21b for fixing the control arm bearing 1 to the chassis of the motor vehicle but in addition also the central portion 20 of the inner part 2 can be inexpensively designed to be flexibly adjustable to the respective requirements in regard to the identification of the control arm bearing by respective transformation so that the waisting described here can be viewed as one of a number of preferred configurations. In particular it is also in accordance with the invention to set a non-rotationally symmetrical response behaviour and a corresponding identification of the control arm bearing 1 by suitable transformation of the central portion 20 and/or design configurations of the insert 45.

LIST OF REFERENCES 1 control arm bearing, rubber-metal bush bearing
2 inner part
4 elastomer body
6 outer bush
20 cylindrical peripheral surface, central portion
21a, 21b flange portion
22a, 22b flange strip
23a, 23b bore
24a, 24b flange strip
25a, 25b bore
26a, 26b curved longitudinal portion
27a, 27b curved longitudinal portion
40a first axial elastomer spur
40b second axial elastomer spur
45 insert
60 outer peripheral surface
80 arm

What is claimed is:
1. A rubber-metal bush bearing, comprising:
a metal inner part,
a metal outer bush,
an elastomer body arranged radially relative to the inner part and the outer bush,
wherein the elastomer body is fixed to the inner part and to the outer bush in material-bonded relationship, wherein the outer bush is configured to be fixed in a bearing eye of an arm, wherein the inner part has at two sides in terminal relationship a respective flat flange portion to be fixed to a component, wherein the inner part is an extruded hollow-chamber profile member which is cut to length and which at longitudinal ends is transformed in terminal relationship into the respective flat flange portion such that oppositely disposed wall portions of the extruded hollow-chamber profile member are brought into mutual surface contact, and wherein a radial wall thickness of the extruded hollow-chamber profile member in a central portion of the inner part is at least 20% greater than a thickness of one of the oppositely disposed wall portions.

2. The rubber-metal bush bearing as set forth in claim 1, wherein the respective flat flange portions have two mutually associated flat-shaped flange strips which are brought into mutual contact and which have longitudinal sides connected together by curved portions.

3. The rubber-metal bush bearing as set forth in claim 2, wherein the respective flat flange portions have a respective bore which extends through the two mutually associated flat-shaped flange strips and which extends perpendicularly to a flange plane.

4. The rubber-metal bush bearing as set forth in claim 1, wherein the inner part has a hollow cylindrical configuration axially inward relative to the respective flat flange portions.

5. The rubber-metal bush bearing as set forth in claim 1, wherein the inner part is waisted by shaping transformation in the central portion.

6. The rubber-metal bush bearing as set forth in claim 1, wherein the elastomer body has an insert which is arranged peripherally around the inner part.

7. The rubber-metal bush bearing as set forth in claim 6, wherein the insert is embedded in elastomer.

8. The rubber-metal bush bearing as set forth in claim 7, wherein the insert comprises a material which is harder than the elastomer.

9. The rubber-metal bush bearing as set forth in claim 6, wherein the insert extends at least over an entire axial extent of the outer bush.

10. The rubber-metal bush bearing as set forth in claim 6 wherein the insert has a peripheral surface facing towards the inner part, and
  wherein, at the peripheral surface facing towards the inner part, the insert is adapted in relation to a curvature thereof to a waisting of the inner part such that a radially continuous elastomer layer is arranged between the inner part and the insert of substantially constant radial thickness over its entire axial extent.

11. The rubber-metal bush bearing as set forth in claim 1, wherein the elastomer body and the outer bush are of an axially slit configuration.

12. The rubber-metal bush bearing as set forth in claim 1, wherein the rubber-metal bush bearing is a control arm bearing.

13. The rubber-metal bush bearing as set forth in claim 12, wherein the control arm bearing is a motor vehicle control arm bearing.

14. The rubber-metal bush bearing as set forth in claim 13, wherein the motor vehicle control arm bearing is a motor vehicle suspension control arm bearing.

15. A rubber-metal bush bearing, comprising:
a metal inner part,
a metal outer bush,
an elastomer body arranged radially relative to the inner part and the outer bush, wherein the elastomer body is fixed to the inner part and to the outer bush in material-bonded relationship, wherein the outer bush is configured to be fixed in a bearing eye of an arm, wherein the inner part has at two sides in terminal relationship a respective flat flange portion to be fixed to a component, wherein the inner part is an extruded hollow-chamber profile member which is cut to length and which at longitudinal ends is transformed in terminal relationship into the respective flat flange portion such that oppositely disposed wall portions of the extruded hollow-chamber profile member are brought into mutual surface contact, wherein the inner part has a hollow cylindrical configuration axially inward relative to the respective flat flange portions, and wherein a radial wall thickness of the extruded hollow-chamber profile member in a region of the hollow cylindrical configuration is at least 20% greater than a thickness of one of the oppositely disposed wall portions.

16. The rubber-metal bush bearing as set forth in claim 15, wherein the respective flat flange portions have two mutually associated flat-shaped flange strips which are brought into mutual contact and which have longitudinal sides connected together by curved portions.

17. The rubber-metal bush bearing as set forth in claim 16, wherein the respective flat flange portions have a respective bore which extends through the two mutually associated flat-shaped flange strips and which extends perpendicularly to a flange plane.

18. A rubber-metal bush bearing, comprising:
a metal inner part,
a metal outer bush,
an elastomer body arranged radially relative to the inner part and the outer bush, wherein the elastomer body is fixed to the inner part and to the outer bush in material-bonded relationship, wherein the outer bush is configured to be fixed in a bearing eye of an arm, wherein the inner part has at two sides in terminal relationship a respective flat flange portion to be fixed to a component, wherein the inner part is an extruded hollow-chamber profile member which is cut to length and which at longitudinal ends is transformed in terminal relationship into the respective flat flange portion such that oppositely disposed wall portions of the extruded hollow-chamber profile member are brought into mutual surface contact, and wherein the inner part is waisted by shaping transformation in a portion which is axially inward relative to the respective flange portions.

19. The rubber-metal bush bearing as set forth in claim 18, wherein the respective flat flange portions have two mutually associated flat-shaped flange strips which are brought into mutual contact and which have longitudinal sides connected together by curved portions.

20. The rubber-metal bush bearing as set forth in claim 19, wherein the respective flat flange portions have a respective bore which extends through the two mutually associated flat-shaped flange strips and which extends perpendicularly to a flange plane.

* * * * *